Dec. 7, 1948.  F. C. THAMES  2,455,449
MACHINE FOR SHEARING GREEN CORN FROM THE
COB INCLUDING AN ANNULAR ROTARY CUTTER
Filed Feb. 23, 1946  5 Sheets-Sheet 5
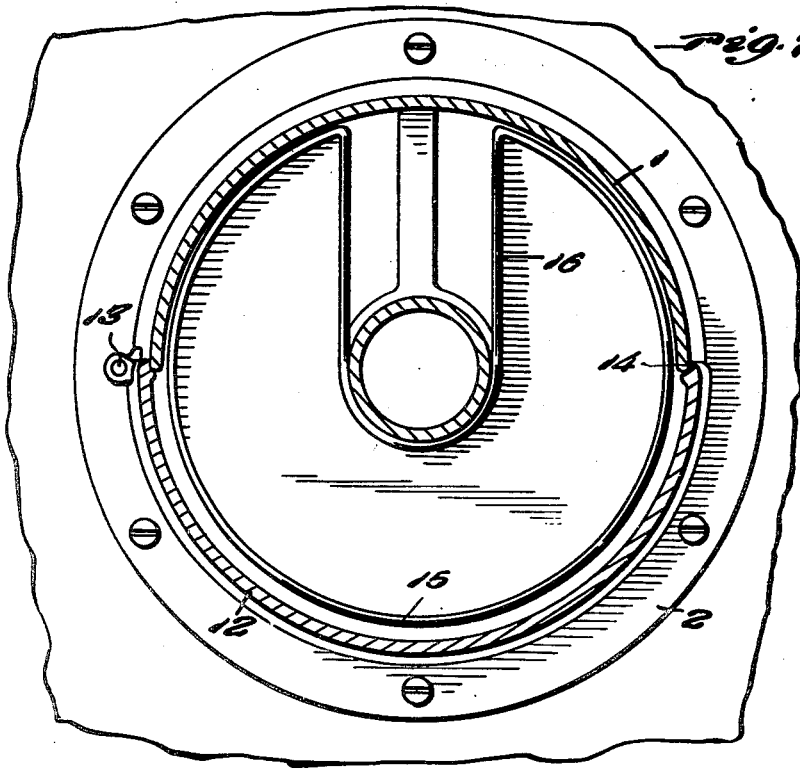
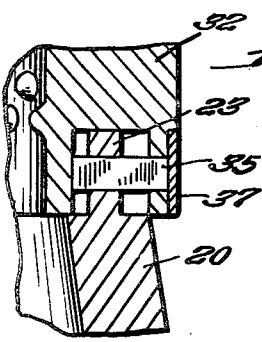
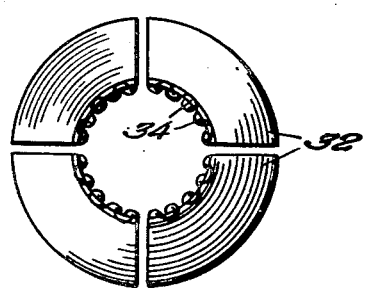
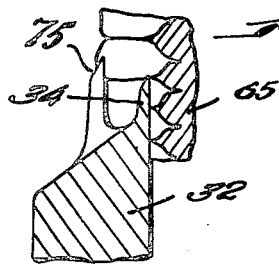

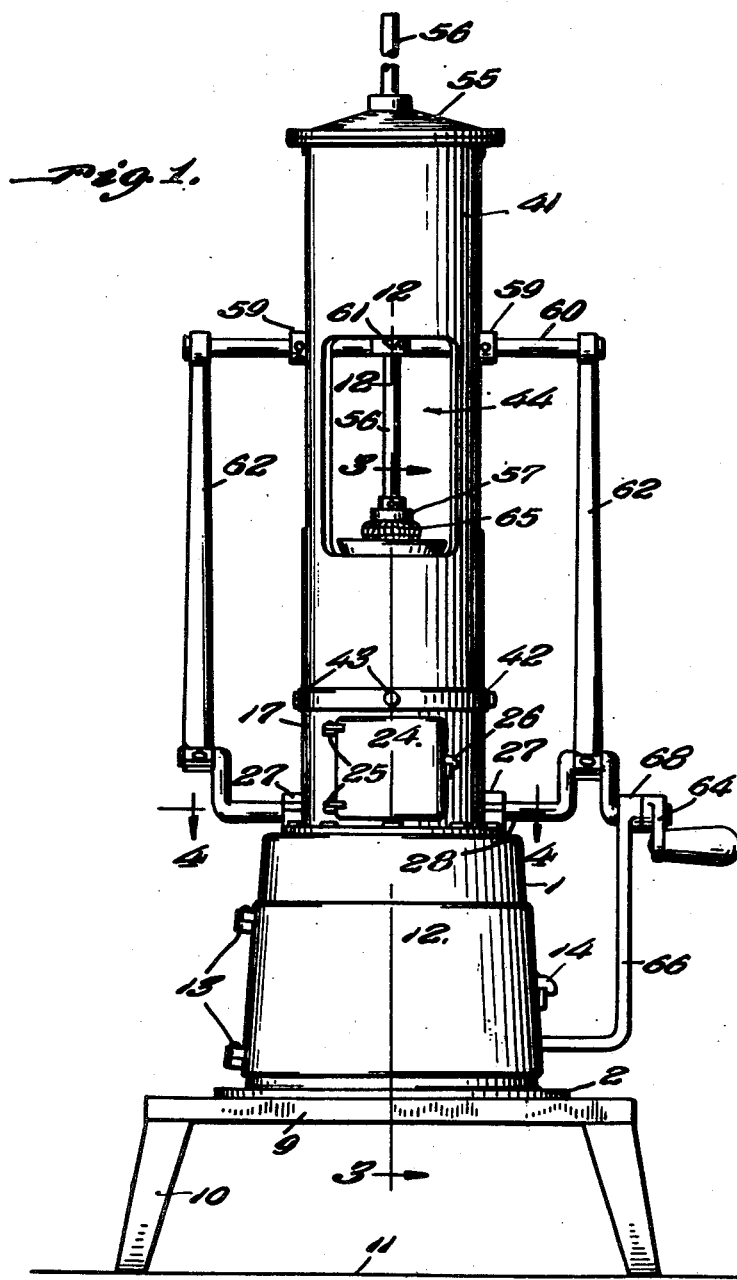

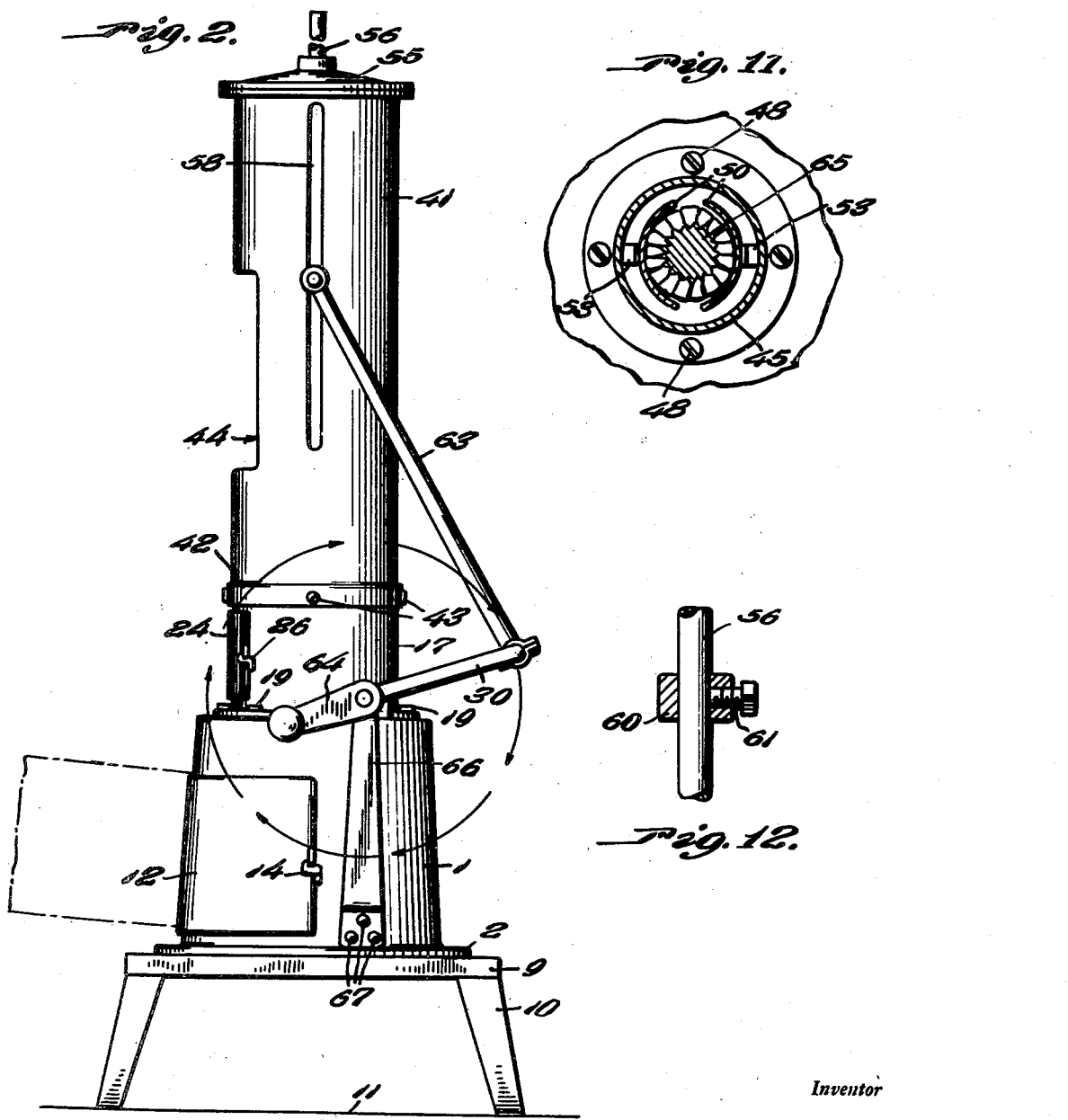

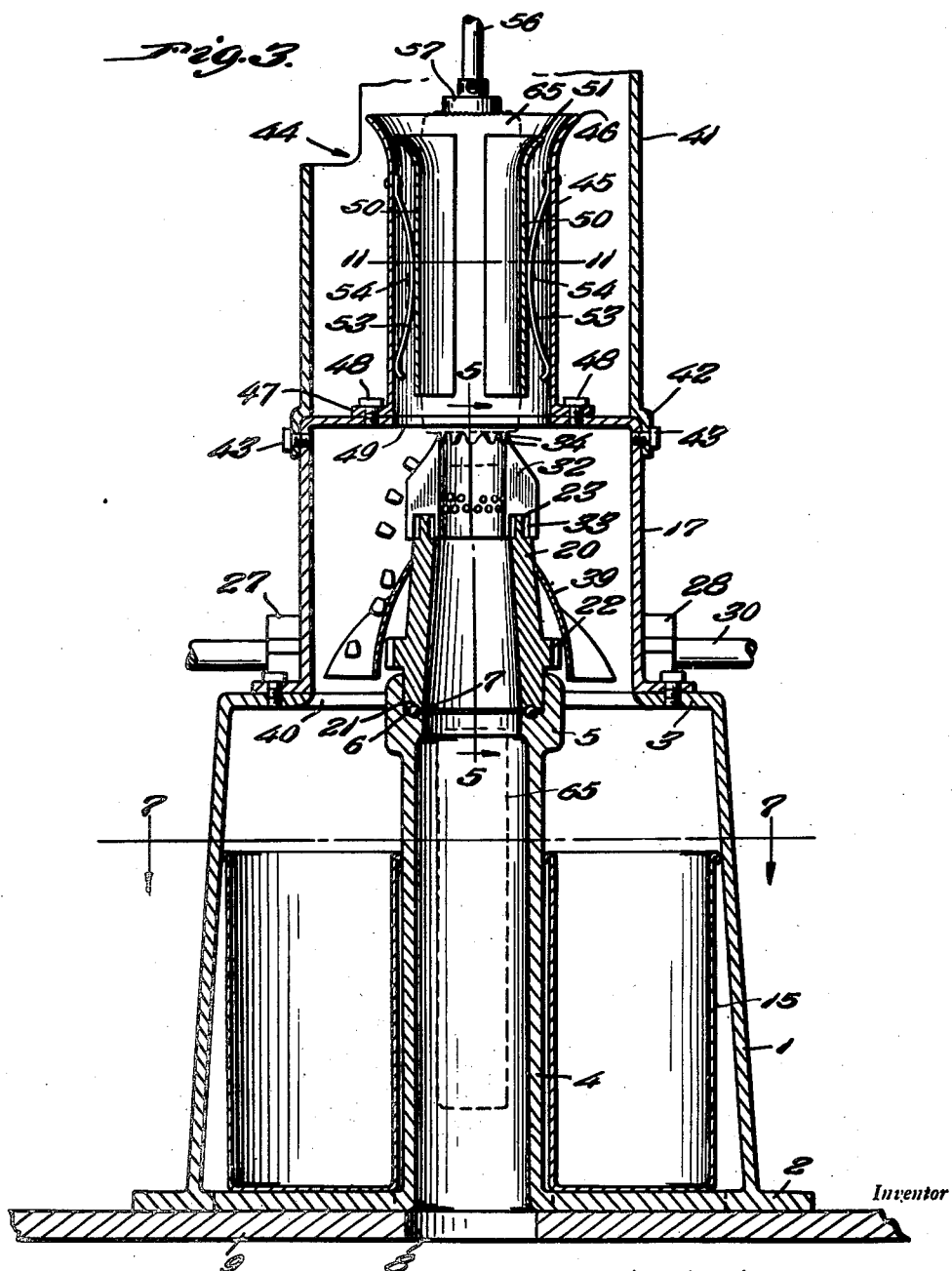

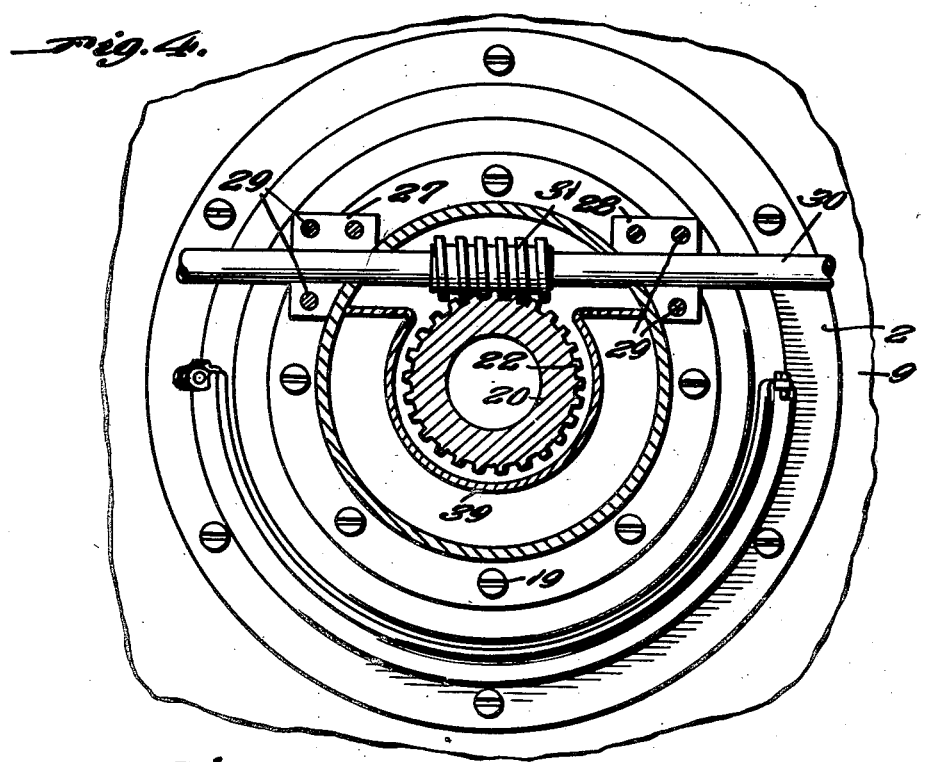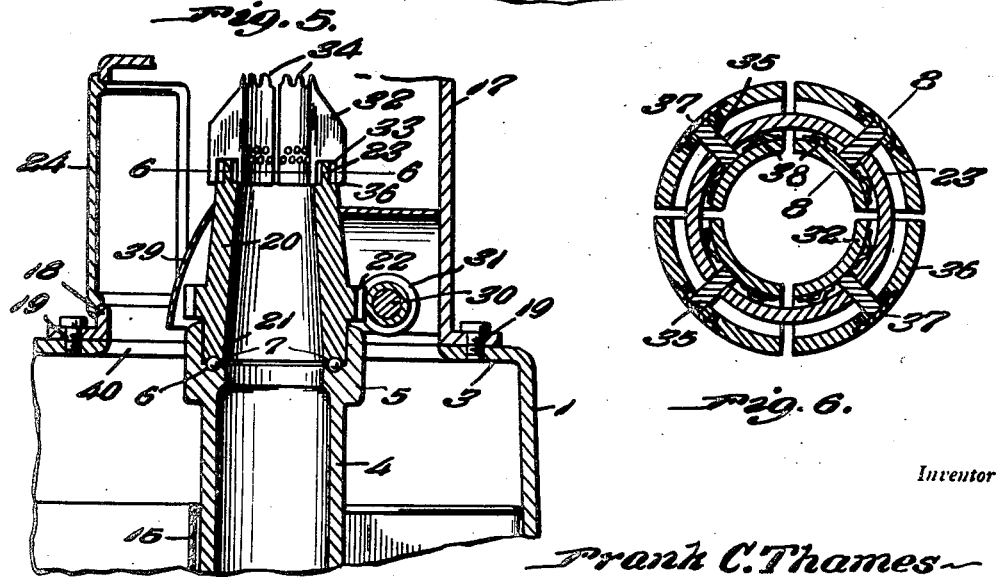

Patented Dec. 7, 1948

2,455,449

UNITED STATES PATENT OFFICE 2,455,449

MACHINE FOR SHEARING GREEN CORN FROM THE COB, INCLUDING AN ANNULAR ROTARY CUTTER

Frank C. Thames, San Antonio, Tex.

Application February 23, 1946, Serial No. 649,708

6 Claims. (Cl. 130—9)

This invention relates to improvements in food preparing machines for use in food canning factories, and more particularly to a shearing machine for shearing the kernels from green corn preparatory to canning the same.

An object of the invention is to provide an improved green corn shearing machine which will include means for receiving ears of green corn of various sizes and expansible cutter blades for shearing the kernels from the ears of corn as they are fed through the machine.

A further object of the invention is to provide an improved green corn shearing machine which will include an expansible ear-feeding chute and an aligned set of rotary, expansible cutting teeth or blades for shearing the kernels from the ears of corn as they are fed through the machine, together with means for separating and collecting the sheared kernels of corn from the cobs.

A still further object of the invention is to provide an improved green corn shearing machine which will be highly efficient in operation and relatively inexpensive to manufacture and produce.

Other objects will appear as the description proceeds.

In the accompanying drawings which form a part of this application,

Figure 1 is a front elevation of the improved green corn shearing machine;

Figure 2 is a side elevation of the green corn shearing machine;

Figure 3 is a sectional view taken on the line 3—3 of Figure 1;

Figure 4 is a sectional view taken on the line 4—4 of Figure 1;

Figure 5 is a sectional view taken on the line 5—5 of Figure 3;

Figure 6 is a sectional view taken on the line 6—6 of Figure 5;

Figure 7 is a sectional view taken on the line 7—7 of Figure 3;

Figure 8 is a sectional view taken on the line 8—8 of Figure 6;

Figure 9 is a plan view looking down on the sectional toothed corn shearing blades;

Figure 10 is an enlarged detailed sectional view of a modified form of cutting knife having inner scalloped teeth for cutting of the corn kernels, and an outer concentrically arranged set of layer teeth extending at a higher level than said first-mentioned and used for cutting off the outer ends of the corn kernels for creamed corn shearing showing the cutter teeth engaging the kernels of an ear of corn;

Figure 11 is a sectional view taken on the line 11—11 of Figure 3; and

Figure 12 is a sectional view on the line 12—12 of Figure 1.

Like characters of reference are used throughout the following specification and the accompanying drawings to designate corresponding parts.

In carrying out the invention, there is provided a cylindrical shaped, tapered main supporting body 1 having an annular supporting flange 2 formed about its lower end, and an inturned flange 3 on its upper end. The body 1 is also provided with an integrally formed, centrally positioned, upstanding tubular member 4, on the upper end of which is formed the enlarged flange cutter supporting collar 5, the same being provided with the inwardly extending annular bearing seat 6 in which an annular groove is formed to receive the ball bearings 7. The tubular member 4 is open at its lower end, and communicates with the opening 8 formed through the supporting platform 9 to which the body 1 is suitably secured.

The legs 10 are provided for the platform 9 to hold the same in spaced relation from a bench or table 11 on which the machine will be supported at a proper height to efficiently operate. A door 12 will be hinged at 13 to the body 1, and at latch 14 will be provided for holding the same closed. A U-shaped kernel receiving receptacle 15 is formed with an inwardly directed slot 16, and is adapted to be placed in the main body 1 around the tubular member 4, when the door is opened.

The cutter blade housing 17 is cylindrical in shape and is of a smaller diameter than the body 1, and is provided with the outwardly extending annular flange 18 which is adapted to be bolted on the inturned upper flange 3 on the upper end of the body 1, by means of the bolt 19.

A tapered cutter blade supporting head 20 is provided with an annular bearing groove 21 in its lower end to engage the ball bearings 7 supported in the annular bearing seat 6 on the upper end of the tubular member 4, and integrally formed gear teeth 22 are formed on the lower periphery of the said head 20. The upper end of the head 20 is shaped to provide the annular upstanding tongue 23, upon which the sectional cutter blades will be mounted. A door 24 will be hinged at 25 on the housing 17 to provide means for interchanging cutter blades when dulled, and cooperates with the latch 26.

Bearing brackets 27 and 28 are secured by bolts 29 to the annular flange 18 on the housing 17, and support the transversely extending crank 30 which extends through the said housing 17 and beyond the opposite side thereof. A worm gear 31 is formed on the crank 30 and is engaged by the gear 22 on the head 20, whereby rotation of the crank causes the head 20 to rotate.

The construction of the sectional toothed cutting head comprises four cooperating cutter blade members 32, the same being recessed or grooved at 33 on their lower ends to seat on and to be supported by the upstanding tongue 23 on the head 20, and said members are formed with the cutting teeth 34 on their upper ends. A modified form of cutter is illustrated in Figure 10, and includes the inner ring of cutting teeth 34 on the cutter blade members 32, and an outer concentrically arranged ring of larger cutting teeth 75 which extend to a slightly higher level than the teeth 32 and are used to cut off the outer ends of the corn kernels for creamed corn shearing. Radially extending keys 35 are secured to the outer surfaces of the blade members 32 and extend through slots in the annular tongue 23 and slots in the outer flange 36 on the base of the members 32, while clips 37 are secured over the ends of the slots 36 to limit the outward movement of the said keys 35. The bowed springs 38 are positioned in the groove 33 between the inner wall of said groove and the tongue 23 on the head 20, to provide for resilient adjustability between said cooperating parts.

An outwardly extending guard sleeve 39 is placed about the cutter head or blade members 32 to direct the kernels of corn as they are cut from the ears of corn, down through the annular passageway 40 and into the receptacle 15.

An upper cylindrical housing 41 is provided at its lower end with the annular positioning flange 42 adapted to seat on the upper end of the cutter blade housing 17 and to be secured thereto by means of the bolts 43 extending through the said flange 42 and into the housing 17. The housing 41 is formed with an opening 44 through which green ears of corn may be directed into the guide chute. The guide chute comprises an outer tubular member 45 flared, as at 46, at its upper end, and is formed with the outwardly extending annular supporting flange 47 on its lower end. The flange 47 is secured to the top of the housing 17 by means of the bolts 48 which extend through the said flange and housing. An aperture 49 is formed through the top of the housing 17 to extend in alignment with the guide chute 45. A pair of ear corn engaging members 50 of semi-circular shape and flared at their upper ends, as at 51, are secured to the bow springs 53 at points 54, and the opposite ends of the springs 53 are secured to the inner wall of the other tubular member 45 to provide an expanding chute construction which will automatically open to receive ears of corn of varying sizes. The guide chute 45 is positioned immediately above and in alignment with the teeth 34 on the cutting members 32.

A removable top 55 is provided for the housing 41 and is apertured to permit the upper end of the pusher shaft 56 to freely reciprocate therethrough. A pusher head 57 is secured on the lower end of the pusher shaft 56 for engagement with the ends of the ears of corn, as they are fed into the guide chute 45.

Oppositely disposed, vertical guard slots 58 are formed in the housing 41 to guide the crosshead bearings 59 as they reciprocate up and down in said slots. The cross-head 60 is secured by the set screw or bolt 61 to the pusher shaft 56, and extends outwardly from the opposite sides of the housing 41 to receive and support the pitmans 62 and 63, whose lower ends are connected to the crank 30. A handle 64 will be secured on the outer end of the crank 30 to manually turn the same, thereby simultaneously rotating the cutter teeth members and intermittently reciprocating the pusher head to force the ears of green corn placed in the guide chute into contact with the rotating cutting teeth. The kernels of corn will be deposited in the receptacle 15, while the corn cobs 65 will be discharged through the central opening 8 in the machine to a suitable collecting receptacle (not shown).

A bracing and supporting bracket or arm 66 will be secured to the housing 1 by the bolts 67, and will extend upwardly, terminating in a bearing 68 to support the outer end of the crank 30.

From the foregoing description, it will be apparent that the mode of operation of the improved green corn shearing machine will be as follows:

The shucked ears of green corn will be fed to a position adjacent the machine on a suitable conveyor belt, or in any other desired manner, and the operator will grasp the handle 64 and rotate the same, which action will cause the crank and pitman mechanism to intermittently reciprocate the pusher rod 56 with the pusher head 57 on its lower end, and will also cause the rotation of the toothed cutting members. As the operator rotates the handle 64, he will take the shucked ears of green corn and deposit them in the guide chute 45 between the resiliently supported cooperating inner chute members 50, and the pusher head 57 will engage the end of the ear of corn and will force the same down into engagement with the annular cutting teeth 34, whereupon the kernels of corn will be cut from the cob and will be deposited through the opening 40 in the upper end of the main housing 1 and into the receptacle 15. The cobs from which the corn has been cut will be forced by means of the pusher head, down through the hollow head member 20 which supports the cutter members and down through the tubular member 4 and through the opening 8 in the supporting platform 9, and finally into a collection receptacle (not shown). This operation will be continued as fast as the corn can be fed to the guide chute and pushed through the machine to have the kernels cut from the cobs 65.

It will be obvious that there has been provided a highly efficient form of green corn shearing machine which will quickly and efficiently shear the kernels of corn from the cobs and separate the kernels from the cobs, where they will be used for canning purposes.

While the preferred embodiment of the invention has been illustrated and described, it will be understood that it is not intended to limit the scope of the invention thereto, as many minor changes and details of construction may be resorted to without departure from the spirit of the invention.

Having thus described my invention, what I claim as new and desire to secure by Letters Patent of the United States is:

1. A green corn shearing machine including a main housing being formed with oppositely disposed vertical slots, a gear operated rotary head thereon, toothed rotary cutting members resiliently supported on said head, an expansible ear guiding chute disposed above said cutting member, a cross head mounted through the slots in said housing, a reciprocating pusher head connected with said crosshead for pushing ears of corn through said guide chute and cutting members, and a crank, gearing and pitman operating means connected with said crosshead for simultaneously operating said pusher head and for rotating said toothed cutting member.

2. A green corn shearing machine including a main housing being formed with oppositely disposed vertical slots, a gear operated rotary head thereon, toothed rotary cutting members resiliently supported on said head, an expansible ear guiding chute resiliently mounted above said cutting members, a cross head mounted through the slots in said housing, a reciprocating pusher head connected with said cross head for pushing ears of corn through said guide chute and cutting members, ear supporting and retarding means in said cutting members, and a crank, gearing and pitman operating means connected with said cross head for simultaneously operating said pusher head and for rotating said toothed cutting members.

3. A green corn shearing machine including a main housing being formed with oppositely disposed vertical slots, a receptacle in said housing for receiving the kernels as they are cut from the ears of corn, a gear operated rotary head in said housing, toothed rotary cutting members resiliently supported on said head, an expansible ear guiding chute resiliently mounted above said cutting members, a cross head mounted through the slots in said housing, a reciprocating pusher head connected with said cross head for pushing ears of corn through said guide chute and cutting members, ear supporting and retarding members in said cutting members, and a crank, gearing and pitman operating means connected with said cross head for simultaneously operating said pusher head and for rotating said toothed cutting members.

4. A green corn shearing machine including a main housing having an upstanding flange on its upper end, a receptacle therein, a gear operated rotary head on said housing, toothed rotary cutting members having arcuate bearing grooves in the lower ends seatable on the flange on said rotary head, bowed cushioning springs between said flange and grooves, an expansible ear guiding chute resiliently mounted above said cutting members, a reciprocating pusher head for pushing ears of corn through said guide chute and cutting members, ear supporting and retarding means in said cutting members, a central discharge opening through said housing for ejecting the cobs of corn after the kernels have been cut therefrom, and a crank, gearing and pitman operating means for simultaneously operating said pusher head and for rotating said toothed cutting members.

5. A green corn shearing machine including a main housing having an upstanding flange on its upper end, a receptacle positioned therein, a gear operated rotary cutting head on said housing, toothed rotary cutting members having arcuate bearing grooves in their lower ends seatable on the flange on said rotary head, bowed cushioning springs between said flange and grooves, an expansible ear guiding chute resiliently mounted above said cutting members, a reciprocating pusher head for pushing ears of corn through said guide chute and cutting members, an operating shaft connected to said pusher head, a cross head connected with said shaft, ear supporting and retarding means in said cutting members, and a crank, gearing and pitman operating means for simultaneously operating said pusher head and for rotating said toothed cutting members.

6. A green corn shearing machine including a main housing having an upstanding flange on its upper end, a receptacle in said housing, a gear operated rotary head thereon, toothed rotary cutting members having arcuate bearing grooves in their lower ends seatable on the flange on said rotary head, bowed cushioning springs between said flange and groove, an expansible ear guiding chute resiliently mounted above said cutting members, a reciprocating pusher head for pushing ears of corn through said guide chute and cutting members, ear supporting and retarding means in said cutting members, kernel guiding means supported below said cutting members for directing the kernels into said receptacle, and a crank, gearing and pitman operating means for simultaneously operating said pusher head and for rotating said toothed cutting members.

FRANK C. THAMES.

REFERENCES CITED

The following references are of record in the file of this patent:

UNITED STATES PATENTS

| Number | Name | Date |
|---|---|---|
| 278,210 | Zehnder | May 22, 1883 |
| 281,868 | Hamilton | July 24, 1883 |
| 1,001,931 | Cookson | Aug. 29, 1911 |
| 1,060,750 | Ginaca | May 6, 1913 |
| 1,452,564 | Lyeso | Apr. 24, 1923 |
| 1,965,469 | Patchen | July 3, 1934 |
| 2,169,963 | Kerr | Aug. 15, 1939 |
| 2,188,934 | Wheeler | Feb. 6, 1940 |